(12) United States Patent
Mori et al.

(10) Patent No.: US 9,398,246 B2
(45) Date of Patent: *Jul. 19, 2016

(54) DISPLAY DEVICE, METHOD OF DRIVING DISPLAY DEVICE, AND PROGRAM

(71) Applicant: JOLED INC., Chiyoda-ku (JP)

(72) Inventors: Hideto Mori, Tokyo (JP); Hiroshi Imamura, Kanagawa (JP)

(73) Assignee: JOLED INC., Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/886,982

(22) Filed: May 3, 2013

(65) Prior Publication Data

US 2013/0242196 A1 Sep. 19, 2013

Related U.S. Application Data

(63) Continuation of application No. 13/128,888, filed as application No. PCT/JP2009/070254 on Dec. 2, 2009, now Pat. No. 8,446,437.

(30) Foreign Application Priority Data

Dec. 11, 2008 (JP) ................................ 2008-316293

(51) Int. Cl.
*G09G 5/10* (2006.01)
*H04N 5/58* (2006.01)
(Continued)

(52) U.S. Cl.
CPC .. *H04N 5/58* (2013.01); *G09G 3/20* (2013.01); *H04N 21/4318* (2013.01);
(Continued)

(58) Field of Classification Search
CPC ................... G09G 2320/046; G09G 2360/16; G09G 5/10; H04N 5/58
USPC ........................................................ 345/690
See application file for complete search history.

(56) References Cited

U.S. PATENT DOCUMENTS 4,847,683 A 7/1989 Lang
6,545,718 B1 4/2003 Nakanishi et al.
(Continued)

FOREIGN PATENT DOCUMENTS

JP 6 30330 2/1994
JP 6 332399 12/1994
(Continued)

OTHER PUBLICATIONS

Korean Office Action with English translation mailed on Sep. 17, 2015 in corresponding Korean application.
(Continued)

*Primary Examiner* — Fred Tzeng
(74) *Attorney, Agent, or Firm* — Oblon, McClelland, Maier & Neustadt, L.L.P

(57) ABSTRACT

Provided is a display device including a panel (158) in which a plurality of pixels that emit light in response to a video signal are arranged, a light emission amount calculation unit (164) that acquires a light emission amount on a plurality of positions of the panel (158) based on a video signal supplied to the panel (158), a storage unit (150) that accumulates data related to the light emission amount accumulated based on a video signal of a plurality of frames, a high-brightness gamma adjustment block (172b) that reduces brightness of a high brightness side of the video signal supplied to the panel (158) based on the data related to the light emission amount accumulated in storage unit (150), and a low-gradation gamma adjustment block (172c) that reduces brightness of a low brightness side of the video signal in conjunction with a reduction in brightness of the high brightness side.

15 Claims, 8 Drawing Sheets

(51) Int. Cl.
  *G09G 3/20* (2006.01)
  *H05B 33/08* (2006.01)
  *H04N 21/431* (2011.01)
  *H04N 21/44* (2011.01)

(52) U.S. Cl.
  CPC ...... *H04N 21/44008* (2013.01); *H05B 33/086* (2013.01); *G09G 2320/0285* (2013.01); *G09G 2320/046* (2013.01); *G09G 2320/066* (2013.01); *G09G 2320/0673* (2013.01); *G09G 2360/16* (2013.01)

(56) References Cited

U.S. PATENT DOCUMENTS

| | | | |
|---|---|---|---|
| 6,906,726 B2 | 6/2005 | Suzuki | |
| 7,483,063 B2 | 1/2009 | Itakura et al. | |
| 7,808,462 B2 | 10/2010 | Tanase et al. | |
| 7,903,050 B2 | 3/2011 | Kimura et al. | |
| 8,289,450 B2 | 10/2012 | Masuda et al. | |
| 8,446,437 B2* | 5/2013 | Mori et al. | 345/690 |
| 2001/0014175 A1 | 8/2001 | Tavor | |
| 2003/0020736 A1 | 1/2003 | Kimura et al. | |
| 2008/0291296 A1 | 11/2008 | Oike | |
| 2010/0165009 A1* | 7/2010 | Mori et al. | 345/690 |
| 2011/0216084 A1* | 9/2011 | Mori et al. | 345/589 |

FOREIGN PATENT DOCUMENTS

| | | |
|---|---|---|
| JP | 2003 47020 | 2/2003 |
| JP | 2005-275180 | 10/2005 |
| JP | 2005 275181 | 10/2005 |
| JP | 2006 284971 | 10/2006 |
| WO | 2008 149842 | 12/2008 |
| WO | WO 2008/149842 A1 | 12/2008 |

OTHER PUBLICATIONS

International Search Report Issued Mar. 9, 2010 in PCT/JP09/070254 filed Dec. 2, 2009.

* cited by examiner

DISPLAY DEVICE, METHOD OF DRIVING DISPLAY DEVICE, AND PROGRAM

CROSS REFERENCE TO RELATED APPLICATION

The present application is a continuation of U.S. application Ser. No. 13/128,888, filed on May 12, 2012, which was the National Stage of International Application No. PCT/JP2009/070254, filed on Dec. 2, 2009, which claimed priority to Japanese Application No. 2006-316293, filed on Dec. 11, 2008. Application Ser. No. 13/128,888 is hereby incorporated by reference in its entirety.

TECHNICAL FIELD

The present invention relates to a display device, a method of driving a display device, and a program.

BACKGROUND ART

Conventionally, as a flat thin display device, a liquid crystal display (LCD) device using a liquid crystal, a plasma display device using plasma, and the like have been put into practical use.

The LCD device is a display device in which a backlight device is installed, and an image is displayed such that when a voltage is applied, an arrangement of liquid crystal molecules changes to pass or block light from the backlight. The plasma display device is a display device that displays an image such that a voltage is applied to a gas sealed in a substrate to create a plasma state, and ultraviolet light generated by energy generated when an original state is returned from the plasma state is irradiated to a luminous body and thus converted to visible light.

Meanwhile, in recent years, a light-emitting type display device using an organic electroluminescence (EL) device in which a device itself emits light when a voltage is applied has been developed. The organic EL device changes from a ground state to an excited state when energy is received by electrolysis and emits energy of a difference as light when the ground state is returned from the excited state. An organic EL display device displays an image using light emitted from the organic EL device.

Unlike the LCD device that requires the backlight, the light-emitting type display device does not require the backlight since the device emits light by itself. Thus, the light-emitting type display device can be configured thinner than the LCD device. Further, compared to the LCD device, the organic EL display device is excellent in a moving image characteristic, a viewing angle characteristic, color reproducibility, and the like and thus has attracted attention as a next generation flat thin display device.

However, in the organic EL device, when a voltage is continuously applied, an emission characteristic deteriorates, and even if the same current is input, brightness deteriorates. As a result, when an emission frequency of a certain pixel is high, the certain pixel is inferior in the emission characteristic as compared to the other pixels, and a phenomenon known as "burn-in" has been a problem.

The burn-in phenomenon occurs even in the LCD device or the plasma display device. In these display devices, since an image is displayed by applying an alternating current voltage, there has been a need for a means for adjusting the applied voltage. On the other hand, in the light-emitting type display device, a technique of correcting the burn-in by controlling a current amount has been employed. For example, a burn-in correction technique in the light-emitting type display device is disclosed in Patent Literature 1.

CITATION LIST

Patent Literature

Patent Literature 1: Japanese Patent Application Laid-Open (JP-A) No. 2005-275181.

SUMMARY OF INVENTION

Technical Problem

However, in the technique disclosed in Patent Literature 1, control is performed to uniformize a light emission amount accumulated for each pixel or each pixel group, and a value greater than original input data is provided to a part in which deterioration of a luminous body is small. For this reason, a balance of a light emission amount can be acquired, but there has been a problem in that the luminous body deteriorates, and thus the lifespan of the luminous body is shortened.

Here, obtaining a burn-in suppression effect by controlling a video signal, particularly, suppressing peak brightness of a high brightness side, may be considered. However, if the peak brightness of the high brightness side is suppressed, a contrast of the whole video deteriorates, and the video loses a three-dimensional effect, and an object or a human skin in the video loses a gloss, leading to low image quality.

The present invention is made in view of the above-mentioned issue, and aims to provide a display device, a method of driving a display device, and a program which are novel and improved, and which are capable of preventing the burn-in phenomenon of the image by controlling the video signal and obtaining an excellent video by suppressing a reduction in contrast.

Solution to Problem

According to a first aspect of the present invention, in order to achieve the above-mentioned object, there is provided a display device including a display unit in which a plurality of pixels that emit light in response to a video signal are arranged, a light emission amount acquisition unit that acquires a light emission amount corresponding to a plurality of positions of the display unit based on a video signal supplied to the display unit, a data accumulation unit that accumulates data related to the light emission amount accumulated based on a video signal of a plurality of frames, a high brightness adjustment unit that reduces brightness of a high brightness side of the video signal supplied to the display unit based on the data related to the light emission amount accumulated in the data accumulation unit, and a low brightness adjustment unit that reduces brightness of a low brightness side of the video signal in conjunction with a reduction in brightness of the high brightness side.

According to the above configuration, a plurality of pixels that emit light in response to a video signal are arranged in a display unit, and a light emission amount is acquired on a plurality of positions of the display unit based on a video signal supplied to the display unit. Data related to the light emission amount accumulated based on a video signal of a plurality of frames is accumulated, and brightness of a high brightness side of the video signal supplied to the display unit is reduced based on the data related to the accumulated light emission amount. Brightness of a low brightness side of the video signal is reduced in conjunction with a reduction in brightness of the high brightness side. Thus, in the case of reducing brightness of the high brightness side in order to prevent the burn-in, a reduction in contrast can be reliably prevented.

The high brightness adjustment unit may further reduce brightness of the high brightness side as the accumulated light emission amount is larger, based on the data related on the light emission amount.

The display device may further include an overall brightness adjustment unit that collectively reduces all brightness of the video signal in conjunction with a reduction in brightness of the high brightness side and the low brightness side.

According to a second aspect of the present invention, in order to achieve the above-mentioned object, there is provided a method of driving a display device including the steps of acquiring a light emission amount corresponding to a plurality of positions of a display unit in which a plurality of pixels that emit light are arranged, based on a video signal supplied to the display unit, accumulating data related to the light emission amount accumulated based on a video signal of a plurality of frames, and reducing brightness of a high brightness side of the video signal supplied to the display unit and reducing brightness of a low brightness side of the video signal in conjunction with a reduction in brightness of the high brightness side, based on the data related to the accumulated light emission amount.

In the step of reducing the brightness, as the accumulated light emission amount is larger, brightness of the high brightness side may be further reduced based on the data related to the light emission amount.

In the step of reducing the brightness, all brightness of the video signal may be collectively reduced in conjunction with a reduction in brightness of the high brightness side and the low brightness side.

According to a third aspect of the present invention, in order to achieve the above-mentioned object, there is provided a program causing a computer to execute the steps of acquiring a light emission amount corresponding to a plurality of positions of a display unit in which a plurality of pixels that emit light are arranged, based on a video signal supplied to the display unit, accumulating data related to the light emission amount accumulated based on a video signal of a plurality of frames, and reducing brightness of a high brightness side of the video signal supplied to the display unit and reducing brightness of a low brightness side of the video signal in conjunction with a reduction in brightness of the high brightness side, based on the data related to the accumulated light emission amount.

Advantageous Effects of Invention

According to the present invention, the burn-in phenomenon can be prevented by controlling the video signal, and a reduction in contrast can be prevented.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted. Further, a description will be made in the following order.

1. Configuration of Display Device According to Embodiment of Present Invention
2. Characteristic of Signal Flowing Through Display Device
3. Configuration of Signal Level Correction Unit
4. Method of Calculating Risk Degree
5. Example of Calculation of Gain in Gain Calculation Unit
6. Method of Driving Display Device.

1. Configuration of Display Device According to Embodiment of Present Invention

Figure 1:
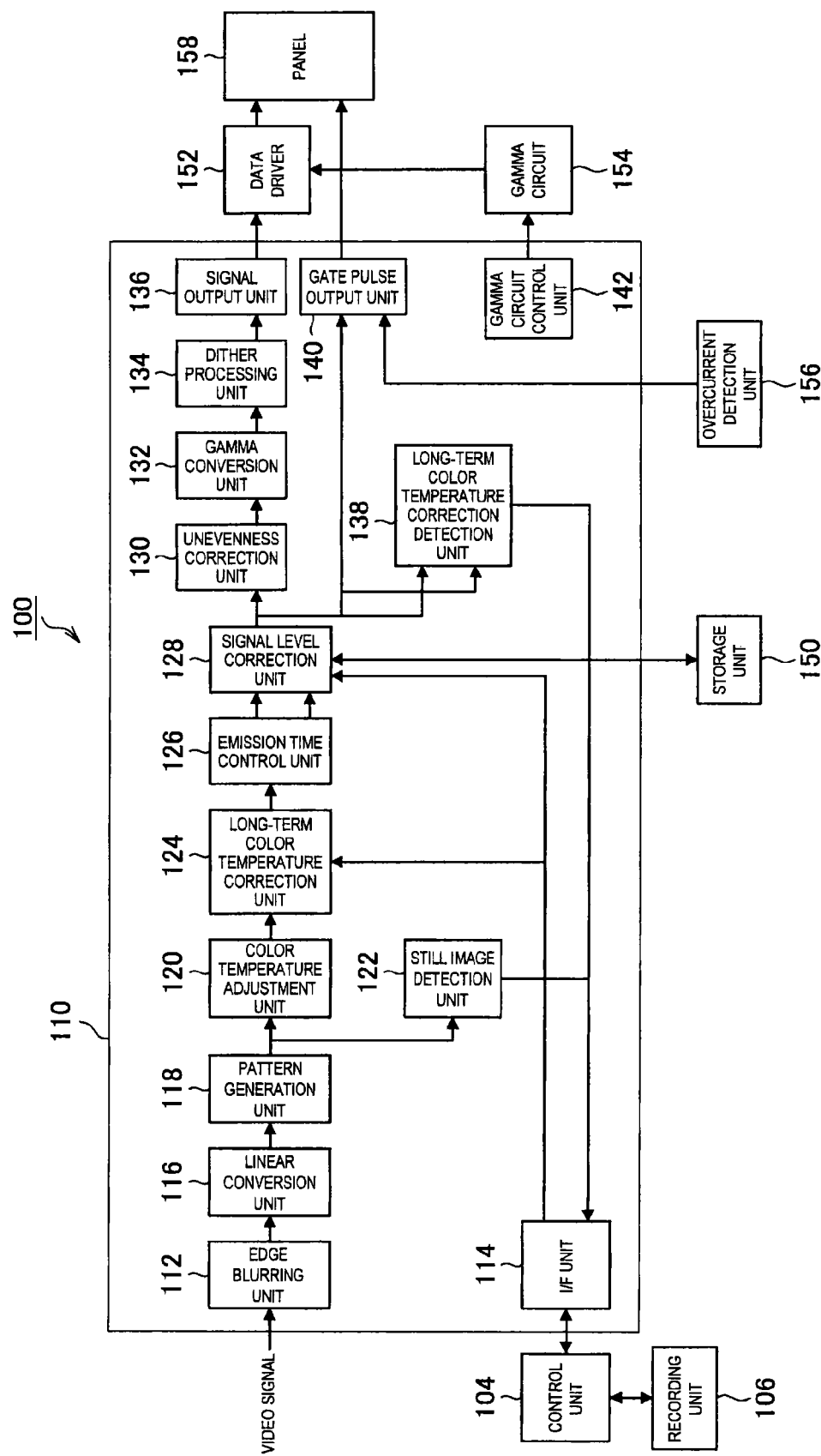
FIG. 1 is an illuminative diagram illuminating a configuration of a display device according to an embodiment of the present invention.

FIG. 1 is an illuminative diagram illuminating a configuration of a display device 100 according to an embodiment of the present invention. Hereinafter, a configuration of the display device 100 according to an embodiment of the present invention will be described with reference to FIG. 1.

As illustrated in FIG. 1, the display device 100 according to an embodiment of the present invention includes a control unit 104, a recording unit 106, a signal processing integrated circuit 110, a storage unit 150, a data driver 152, a gamma circuit 154, an overcurrent detection unit 156, and a panel 158.

The signal processing integrated circuit 110 includes an edge blurring unit 112, an interface (I/F) unit 114, a linear conversion unit 116, a pattern generation unit 118, a color temperature adjustment unit 120, a still image detection unit 122, a long-term color temperature correction unit 124, and an emission time control unit 126. The signal processing integrated circuit 110 further includes a signal level correction unit 128, an unevenness correction unit 130, a gamma conversion unit 132, a dither processing unit 134, a signal output unit 136, a long-term color temperature correction detection unit 138, a gate pulse output unit 140, and a gamma circuit control unit 142.

If a video signal is received, the display device 100 displays a video through a panel 158 by analyzing the video signal and lighting up pixels arranged inside the panel 158, which will be described later, according to the analyzed content.

The control unit 104 controls the signal processing integrated circuit 110 and transmits/receives a signal to/from the I/F unit 114. The control unit 104 performs various signal processing on the signal received from the I/F unit 114. For example, signal processing performed by the control unit 104 includes a calculation of a gain used for an adjustment of brightness of an image displayed on the panel 158.

The recording unit 106 stores information used for the control unit 104 to control the signal processing integrated circuit 110. Preferably, a memory allowing information to be stored without being erased even when the display device 100 is powered off is used as the recording unit 106. For example, as the memory used as the recording unit 106, an electronically erasable and programmable read only memory (EEPROM) that can electrically rewrite the content may be used. The EEPROM is a non-volatile memory in which writing or erasing of data can be performed, mounted on a substrate. The EEPROM is a memory suitable for storing information of the display device 100 that changes from hour to hour.

The signal processing integrated circuit 110 receives the video signal and performs signal processing on the input video signal. In the present embodiment, the video signal input to the signal processing integrated circuit 110 is a digital signal, and the signal width is 10 bits. Signal processing on the input video signal is performed by each block in the signal processing integrated circuit 110.

The edge blurring unit 112 performs signal processing for blurring an edge on the input video signal. Specifically, in order to prevent a phenomenon in which an image to be directed to the panel 158 is burned in, the edge blurring unit 112 blurs an edge by intentionally displacing an image, thereby preventing the burn-in phenomenon of the image.

The linear conversion unit 116 performs signal processing of converting the video signal, in which an output has a gamma characteristic with respect to an input, to have a linear characteristic from a gamma characteristic. By performing signal processing so that an output can have a linear characteristic with respect to an input through the linear conversion unit 116, various processing on an image displayed by the panel 158 can easily be performed. Through signal processing by the linear conversion unit 116, the signal width of the video signal is expanded from 10 bits to 14 bits. If the video signal is converted by the linear conversion unit 116 to have the linear characteristic, the video signal is converted by the gamma conversion unit 132, which will be described later, to have the gamma characteristic.

The pattern generation unit 118 generates a test pattern used by image processing in the display device 100. For example, as the test pattern used by image processing in the display device 100, there is a test pattern used for display inspection of the panel 159.

The color temperature adjustment unit 120 performs an adjustment of a color temperature of an image and performs an adjustment of a color displayed by the panel 158 of the display device 100. Although not illustrated in FIG. 1, the display device 100 includes a color temperature adjustment means for adjusting a color temperature. When a user operates the color temperature adjustment means, a color temperature of an image displayed on a screen can be manually adjusted.

The long-term color temperature correction unit 124 corrects a time-dependent change caused by a difference in a brightness/time characteristic (LT characteristic) of each of R (red), G (green), and B (blue) of an organic EL device. In the organic EL device, since R, G, and B are different in LT characteristic, a color balance collapses as an emission time elapses. The color balance is corrected by the long-term color temperature correction unit 124.

The emission time control unit 126 calculates a duty ratio of a pulse when a video is displayed on the panel 158 and controls an emission time of the organic EL device. The display device 100 causes the organic EL device to emit light and display an image by allowing an electric current to flow through the organic EL device in the panel 158 while the pulse is in a HI state.

The signal level correction unit 128 adjusts brightness of the video displayed on the panel 158 by correcting a signal level of the video signal in order to prevent the burn-in phenomenon of the image. The burn-in phenomenon is a deterioration phenomenon of an emission characteristic that occurs when an emission frequency of a certain pixel is higher than the other pixels. A pixel that has deteriorated experiences degradation of brightness compared to a pixel that has not deteriorated, and thus a brightness difference with a surrounding portion that has not deteriorated increases. Due to the difference in brightness, it appears that a character is burned onto a screen.

The signal level correction unit 128 calculates a light emission amount of each pixel or a pixel group from the video signal and the duty ratio of the pulse calculated by the emission time control unit 126, calculates a gain for reducing brightness as necessary based on the calculated light emission amount, and multiplies the video signal by the calculated gain. A configuration of the signal level correction unit 128 will be described later.

The long-term color temperature correction detection unit 138 detects information that is to be corrected by the long-term color temperature correction unit 124. The information detected by the long-term color temperature correction detection unit 138 is transmitted to the control unit 104 via the I/F unit 114 and recorded in the recording unit 106 through the control unit 104.

The unevenness correction unit 130 corrects unevenness of an image or a video displayed on the panel 158. The unevenness correction unit 130 performs correction on horizontal streaks and vertical streaks of the panel 158 and patches of the whole screen based on a level of an input signal or a coordinate position.

The gamma conversion unit 132 performs signal processing for converting the video signal, which has been converted by the linear conversion unit 116 to have the linear characteristic, to have a gamma characteristic. Signal processing performed by the gamma conversion unit 132 is signal processing of canceling the gamma characteristic included in the panel 158 and converting into a signal having the linear characteristic so that the organic EL device inside the panel 159 can emit light according to an electric current of a signal. By performing signal processing through the gamma conversion unit 132, the signal width changes from 14 bits to 12 bits.

The dither processing unit 134 performs dithering on the signal converted by the gamma conversion unit 132. Dithering refers to combining and displaying colors that can be displayed in order to express an intermediate color in an environment in which the number of available colors is small. By performing dithering through the dither processing unit 134, it is possible to apparently create and display a color that cannot originally be displayed on the panel. Due to dithering by the dither processing unit 134, the signal width changes from 12 bits to 10 bits.

The signal output unit 136 outputs the signal subjected to dithering in the dither processing unit 134 to the data driver 152. The signal transferred from the signal output unit 136 to the data driver 152 is a signal including information related to a light emission amount of each of R, G, and B, and a signal including information of an emission time is output in a pulse form from the gate pulse output unit 140.

The gate pulse output unit 140 outputs a pulse for controlling the emission time of the panel 158. The pulse output from the gate pulse output unit 140 is a pulse that has the duty ratio calculated by the emission time control unit 126. The emission time of each pixel in the panel 158 is decided according to the pulse from the gate pulse output unit 140.

The gamma circuit control unit 142 provides the gamma circuit 154 with a setting value. The setting value provided by the gamma circuit control unit 142 is a reference voltage that is to be provided to a ladder resistor of a digital/analog (D/A) converter included in the data driver 152.

The storage unit 150 stores information of a pixel or a pixel group that emits light while exceeding a predetermined brightness, which is necessary when the signal level correction unit 128 corrects brightness, in association with information of an exceeding amount. As the storage unit 150, unlike the recording unit 106, a memory in which the content is erased when power is turned off may be used. As such a memory, for example, a synchronous dynamic random access memory (SDRAM) may be used.

The overcurrent detection unit 156 detects an overcurrent when an overcurrent occurs, for example, due to a short circuit of a substrate, and notifies the gate pulse output unit 140 of this fact. Due to the overcurrent occurrence notice from the overcurrent detection unit 156, when the overcurrent occurs, the overcurrent is prevented from being applied to the panel 158.

The data driver 152 performs signal processing on the signal received from the signal output unit 136 and outputs a signal for displaying a video through the panel 158 to the panel 158. The data driver 152 includes a D/A converter (not shown), and the D/A converter converts a digital signal to an analog signal and outputs the analog signal.

The gamma circuit 154 provides the ladder resistor of the D/A converter included in the data driver 152 with the reference voltage. The reference voltage to be provided to the ladder resistor is generated by the gamma circuit control unit 142 as described above.

The panel 158 receives an output signal from the data driver 152 and an output from the gate pulse output unit 140 and causes the organic EL device that is an example of the light-emitting device to emit light, thereby displaying a moving image or a still image. A surface of the panel 158 for displaying an image has a flat shape. The organic EL device is a light-emitting type device that emits light when a voltage is applied, and the light emission amount is in proportion to the voltage. Thus, an IL characteristic (a current-light emission amount characteristic) of the organic EL device has a proportional relationship.

In the panel 158, although not shown, a scan line for selecting a pixel at a predetermined scan period, a data line for providing brightness information for driving a pixel, and a pixel circuit that controls a current amount based on the brightness information and causes the organic EL device, which is the light-emitting device, to emit light according to the current amount are configured to be arranged in the form of a matrix. The scan line, the data line, and the pixel circuit are configured as described above, and thus the display device 100 can display the video according to the video signal.

A configuration of the display device 100 according to an embodiment of the present invention has been described above with reference to FIG. 1. In the display device 100 illustrated in FIG. 1, the linear conversion unit 116 converts the video signal to have the linear characteristic, and thereafter the converted video signal is input to the pattern generation unit 118, but the pattern generation unit 118 and the linear conversion unit 116 may substitute for each other.

2. Characteristic of Signal Flowing through Display Device

Next, transition of a signal characteristic of a signal flowing through the display device 100 according to an embodiment of the present invention will be described with reference to FIG. 2. In each graph of FIG. 2, a horizontal axis denotes an input, and a vertical axis denotes an output.

Figure 2A:
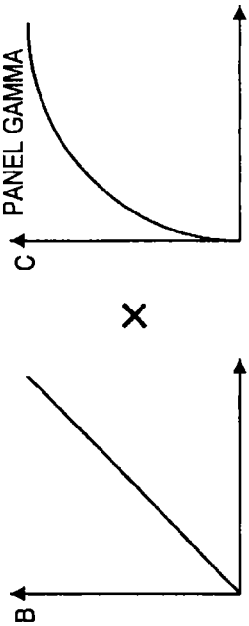
FIGS. 2A to 2F are illuminative diagrams illuminating transition of a characteristic of a signal flowing through a display device according to an embodiment of the present invention.

FIG. 2A illustrates a state in which, when a video signal of a subject is input to the signal processing integrated circuit 110, the linear conversion unit 116 multiplies a video signal in which an output A has a gamma characteristic with respect to a light amount of a subject by a reverse gamma curve (a linear gamma). As a result, the video signal is converted so that the output can have the linear characteristic with respect to the light amount of the subject.

Figure 2B:
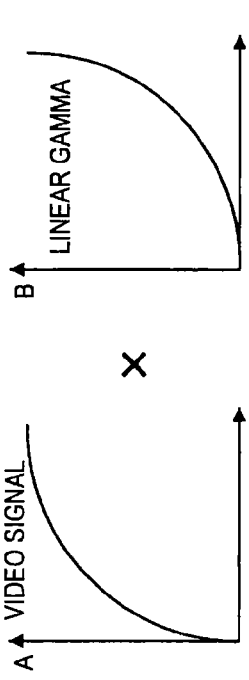

FIG. 2B illustrates a state in which the gamma conversion unit 132 multiplies the video signal, which has been converted by the linear conversion unit 116 so that a characteristic of an output B can have a linear characteristic with respect to an input of a light amount of a subject, by a gamma curve. As a result, the video signal is converted so that an output can have a gamma characteristic with respect to an input of a light amount of a subject.

Figure 2C:
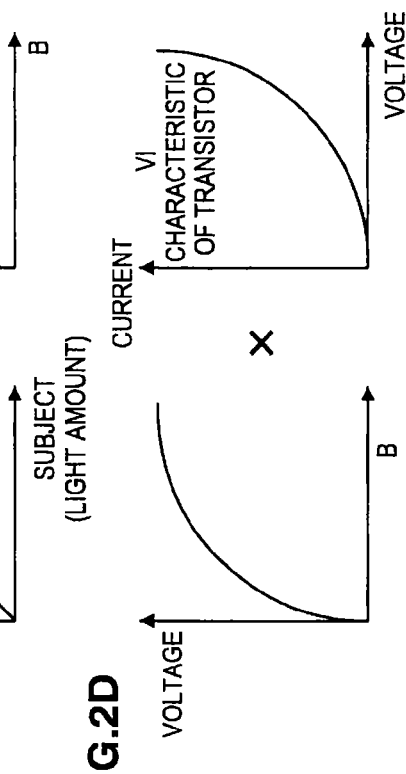

FIG. 2C illustrates the data driver 152 performing D/A conversion on a video signal that has been converted so that a characteristic of an output C can have a gamma characteristic with respect to an input of a light amount of a subject. In D/A conversion, a relationship between an input and an output has a linear characteristic. Thus, by performing D/A conversion through the data driver 152, when a light amount of a subject is input, an output voltage has a gamma characteristic.

Figure 2D:
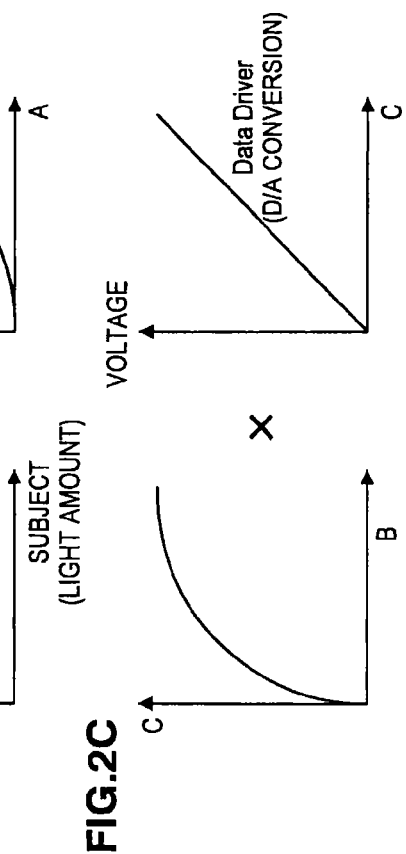

FIG. 2D illustrates that both gamma characteristics are reversed as a video signal in which D/A conversion has been performed is input to a transistor included in the panel 158. A VI characteristic of the transistor is a gamma characteristic that has a curve opposite to a gamma characteristic of an output voltage with respect to an input of a light amount of a subject. Thus, when a light amount of a subject is input, conversion can be performed again so that an output current can have a linear characteristic.

Figure 2E:
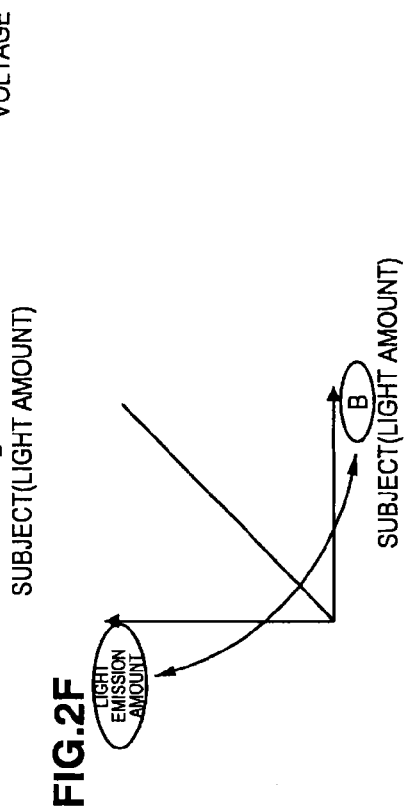

FIG. 2E illustrates that, when a light amount of a subject is input, as a signal in which an output current has a linear characteristic is input to the panel 158, a signal having a linear characteristic is multiplied by an IL characteristic of the organic EL device having a linear characteristic as described above.

Figure 2F:
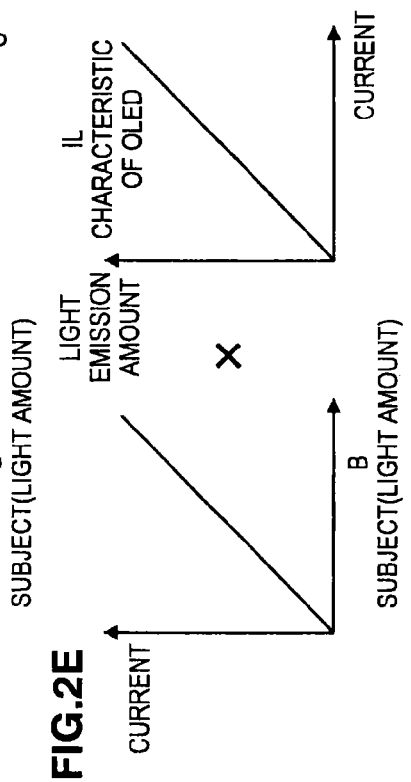

As a result, as illustrated in FIG. 2F, when a light amount of a subject is input, a light emission amount of a panel (an organic light emitting diode (OLED)) has a linear characteristic. For this reason, by multiplying a reverse gamma curve and converting the video signal to have a linear characteristic through the linear conversion unit 116, signal processing can be performed using sections from the linear conversion unit 116 to the gamma conversion unit 132 in the signal processing integrated circuit 110 illustrated in FIG. 1 as a linear area.

Transition of a signal characteristic of a signal flowing through the display device 100 according to an embodiment of the present invention has been described above.

3. Configuration of Signal Level Correction Unit

Figure 3:
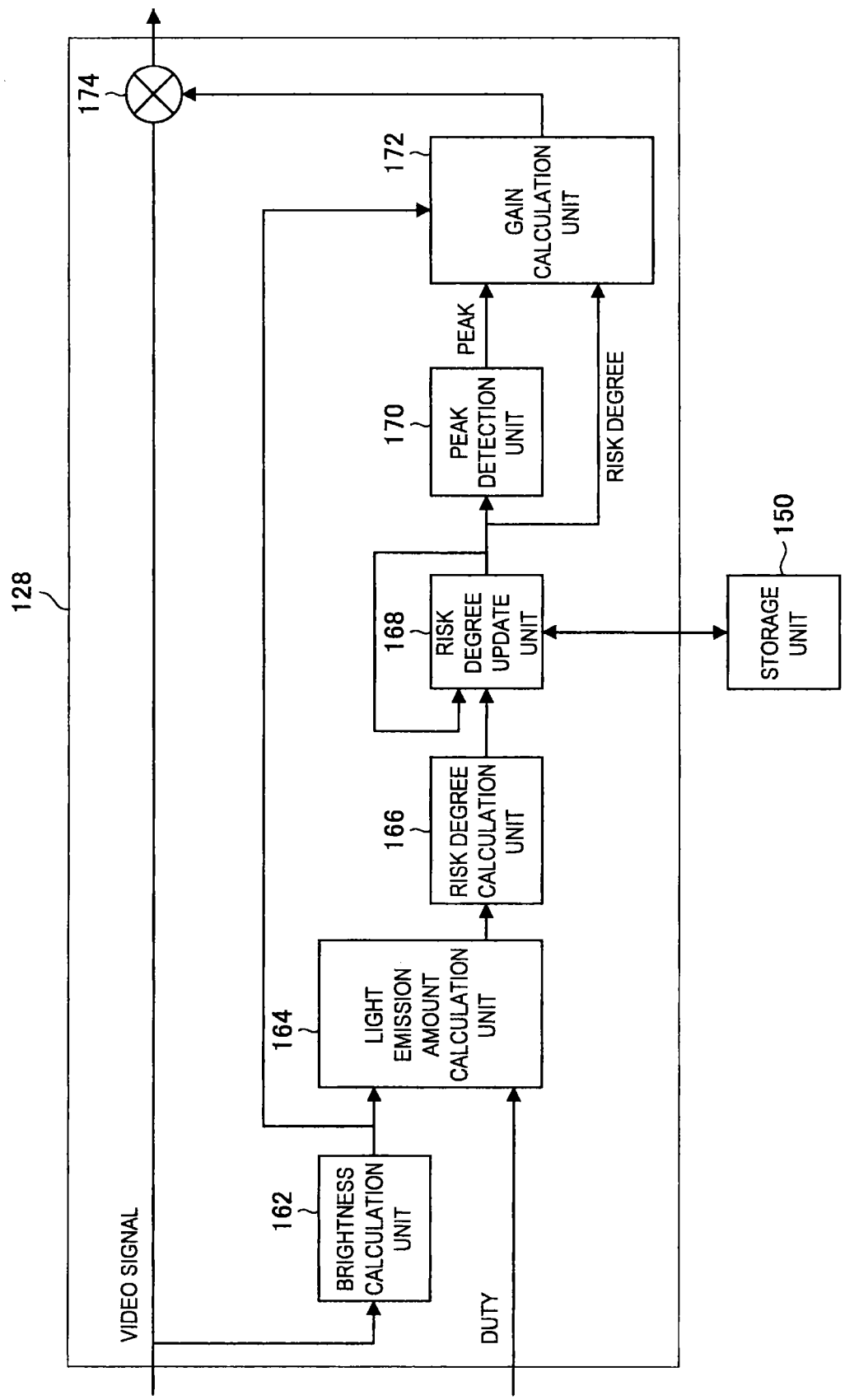
FIG. 3 is an illuminative diagram illuminating a configuration of a signal level correction unit according to an embodiment of the present invention.

Next, a configuration of the signal level correction unit 128 according to an embodiment of the present invention will be described. FIG. 3 is an schematic diagram illuminating a configuration of the signal level correction unit 128. Hereinafter, a configuration of the signal level correction unit 128 according to an embodiment of the present invention will be described with reference to FIG. 3.

As illustrated in FIG. 3, the signal level correction unit 128 includes a brightness calculation unit 162, a light emission amount calculation unit 164, a risk degree calculation unit 166, a risk degree update unit 168, a peak detection unit 170, a gain calculation unit 172, and a multiplier 174.

The brightness calculation unit 162 receives the video signal having a linear characteristic that has been converted by the linear conversion unit 116 and calculates brightness from the input video signal.

The light emission amount calculation unit 164 receives the brightness calculated by the brightness calculation unit 162 and the duty ratio calculated by the emission time control unit 126 and calculates a light emission amount per frame of each pixel that is obtained by multiplying the brightness by the duty ratio (obtained by brightness×duty ratio). In the OLED panel, the organic EL device has a linear relationship between a current and a light emission amount. Thus, by calculating the brightness from the video signal and inputting the calculated brightness and the duty ratio of the pulse to the light emission amount calculation unit, the light emission amount calculation unit 164 can calculate a light emission amount per frame of each pixel of the panel 158 that emits light based on a video signal of each input frame.

The risk degree calculation unit 166 calculates a light emission amount parameter corresponding to the light emission amount based on the light emission amount calculated by the light emission amount calculation unit 164. The light emission amount parameter represents a degree of a burn-in risk of a pixel or a pixel group. Hereinafter, the light emission amount parameter calculated by the risk degree calculation unit 166 is referred to as a "risk degree." The risk degree calculated by the risk degree calculation unit 166 is transmitted to the risk degree update unit 168.

The risk degree update unit 168 accumulates the risk degree calculated by the risk degree calculation unit 166 in the storage unit 150 for each pixel or each pixel group in which a plurality of pixels are collected. By accumulating the risk degree calculated by the risk degree calculation unit 166 for each pixel or each pixel group, a relationship between each pixel or each pixel group on the screen and the risk degree can be known. In this specification, information of the risk degree accumulated for each pixel or each pixel group is referred to as a "risk degree map."

A method of collecting pixels when setting a pixel group can be freely designated according to a design and is not limited to a specific collection method. A pixel group may be set by making the number of pixels in a horizontal direction equal to the number of pixels in a vertical direction or by making the number of pixels in a horizontal direction different from the number of pixels in a vertical direction.

The storage unit 150 accumulates the risk degree calculated by the risk degree calculation unit 166 and stores the accumulated risk degree as the risk degree map. The risk degree is sequentially accumulated during an operation of the display device 100, and when the display device 100 is powered off, the accumulated risk degree is reset. For this reason, as described above, as the storage unit 150, a memory in which the content is erased when power is turned off, for example, an SDRAM, is preferably used.

4. Calculation Method of Risk Degree

Here, a method of calculating the risk degree in the risk degree calculation unit 166 according to an embodiment of the present invention will be described.

Figure 4:
FIG. 4 is an illuminative diagram illustrating an example of an image displayed on a display device according to an embodiment of the present invention.
Figure 5A:
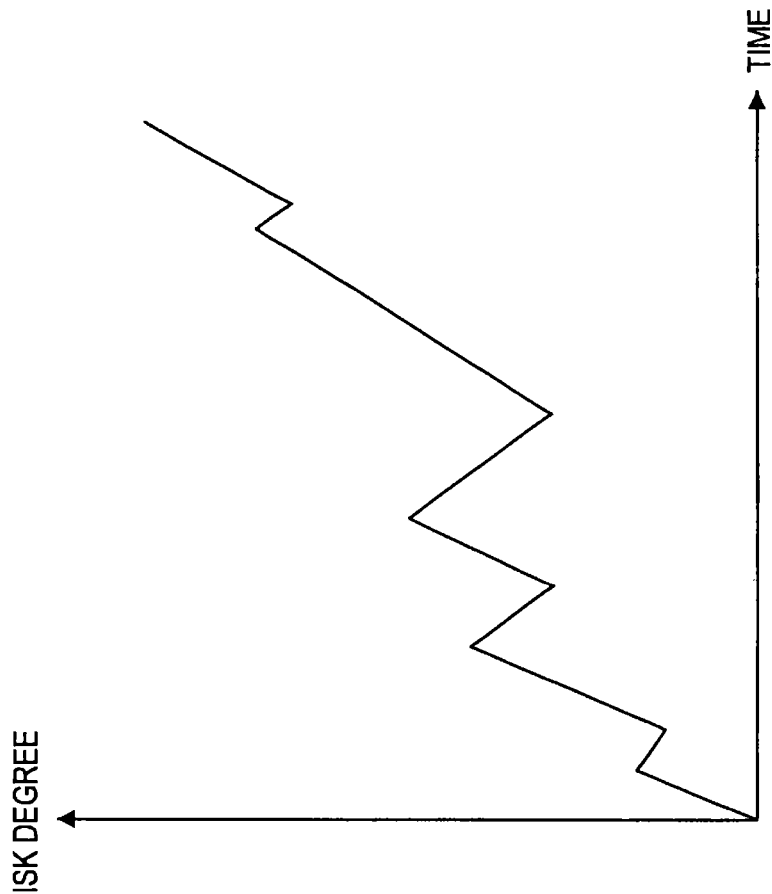
FIGS. 5A and 5B are illuminative diagrams illuminating an example of a calculation of a risk degree in a risk degree calculation unit according to an embodiment of the present invention.
Figure 5B:
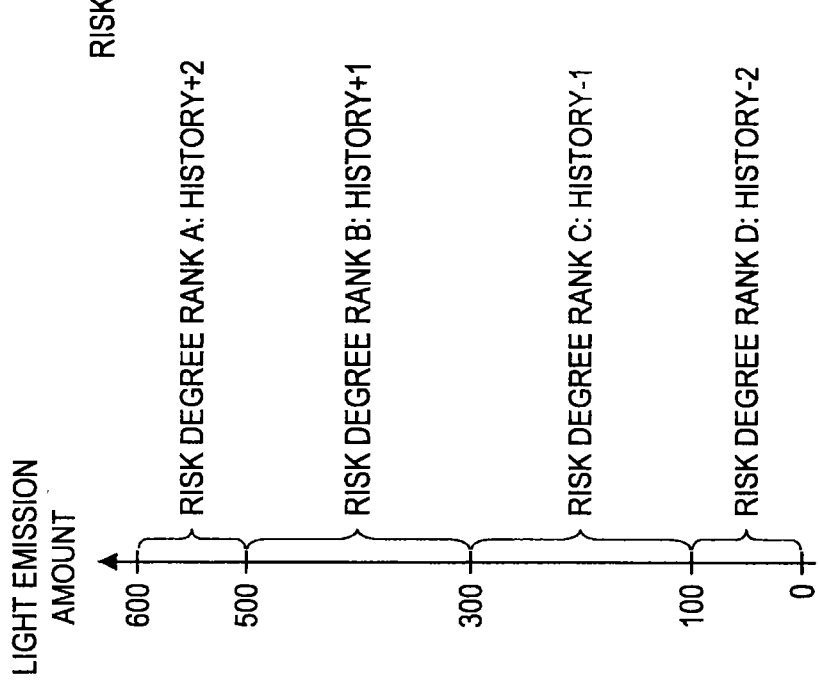

FIG. 4 is an illuminative diagram illustrating an example of an image displayed at a certain time on the display device 100 according to an embodiment of the present invention. FIG. 5 is an illuminative diagram illuminating an example of a calculation of the risk degree in the risk degree calculation unit 166. FIG. 5A illustrates that by detecting the light emission amount calculated by the light emission calculation unit 164 to focus on a certain pixel in the panel 158, a calculation of the risk degree is performed. FIG. 5B is a schematic diagram illustrating the risk degree map.

As illustrated in FIG. 5A, for example, when a light emission amount of a pixel or a pixel group that emits light in response to an input of the video signal has been between 500 and 600 at a certain time, a burn-in risk degree rank is judged as a rank A, and 2 is added to a history of a risk degree of a corresponding pixel or pixel group. Further, when a light emission amount of a pixel or a pixel group that emits light in response to an input of the video signal has been between 300 and 500 at a certain time, a burn-in risk degree rank is judged as a rank B, and 1 is added to a history of a risk degree of a corresponding pixel or pixel group.

Meanwhile, when a light emission amount of a pixel or a pixel group that emits light in response to an input of the video signal has been between 100 and 300 at a certain time, a burn-in risk degree rank is judged as a rank C, and 1 is subtracted from a history of a risk degree of a corresponding pixel or pixel group. Further, when a light emission amount of a pixel or a pixel group that emits light in response to an input of the video signal has been between 0 and 100 at a certain time, a burn-in risk degree rank is judged as a rank D, and 2 is subtracted from a history of a risk degree of a corresponding pixel or pixel group.

As described above, by detecting a light emission amount at a predetermined interval in units of pixels or in units of pixel groups and repeating addition and subtraction of a history of a risk degree of a corresponding pixel or pixel group based on the detected light emission amount, a time in which power of the display device 100 is supplied and a risk degree on the whole screen are continuously calculated. The detection of the light emission amount may be performed at intervals of one frame or a predetermined number of frames.

By calculating the risk degree on the whole screen, the risk degree on all pixels or all pixel groups can be calculated. Thus, the risk degree map can be created by associating the position of a pixel or a pixel group on a screen with the risk degree.

Referring to an image illustrated in FIG. 4, a time display section at an upper left side of an image of FIG. 4 is always displayed on a screen. Since the time display section is typically displayed at a relatively high brightness, pixels displaying a time are high in rank of a burn-in risk degree, and a risk degree increases as a time elapses as long as the pixels continuously display the time.

FIG. 5B illustrates that a risk degree of pixels that are displaying a time is rising in the risk degree map. A pixel that does not correspond to the time display section is not large in amount of rise in risk degree since a display image changes. However, as long as the pixels of the time display section continuously display the time, the risk degree rises as a time elapses, and thus a value of the risk degree of the pixels of the time display section rises in the risk degree map.

A relationship between the position and the risk degree of the pixel or the pixel group has been described in the form of the risk degree map for easy understanding, but the storage unit 150 stores position information of the pixel or the pixel group and information of the risk degree in the string-attached form.

A relationship between the light emission amount and the risk degree and a relationship between the risk degree and the history are not limited to the above examples. A range of the light emission amount, the risk degree, and addition and subtraction on the history can freely be set according to a design.

A method of calculating the risk degree in the risk degree calculation unit 166 according to an embodiment of the present invention has been described above. In the case of calculating the risk degree in units of pixel groups, the light emission amount calculation unit 164 may calculate the light emission amount in units of corresponding pixel groups.

The peak detection unit 170 receives the risk degree map obtained by accumulation of the risk degree from the storage unit 150, and detects and outputs the position of a pixel or a pixel group having a peak risk degree and a value of the risk degree from the input risk degree map. The peak detection unit 170 outputs the detected position of the pixel or the pixel group and the value of the risk degree to the gain calculation unit 172.

The gain calculation unit 172 receives the brightness calculated by the brightness calculation unit 162, the peak value detected by the peak detection unit 170, and the risk degree stored in the storage unit 150, and calculates a gain by which the video signal is multiplied in the multiplier 174 based on the input information. The gain calculated by the gain calculation unit 172 is input to the multiplier 174, and correction on the video signal input to the multiplier 174 is performed. A method of calculating the gain in the gain calculation unit 172 will be described later.

The multiplier 174 receives the video signal and the gain calculated by the gain calculation unit 172, multiplies the video signal by the gain, and outputs the video signal multiplied by the gain.

5. Example of Calculation of Gain in Gain Calculation Unit 172

Figure 6:
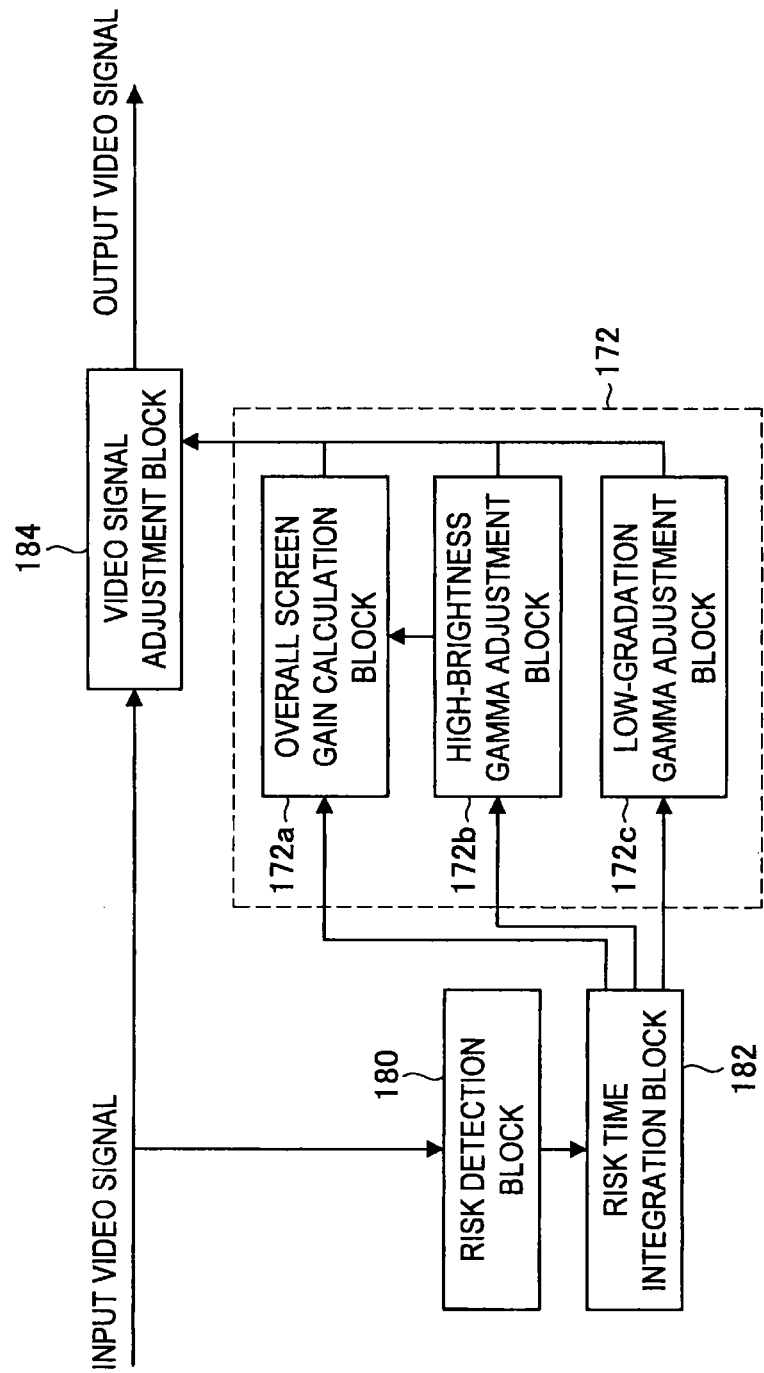
FIG. 6 is a schematic diagram illustrating a configuration of a gain calculation unit and the vicinity thereof.

Hereinafter, an example of a calculation of a gain in the gain calculation unit 172 will be described in detail. FIG. 6 is a schematic diagram illustrating a configuration of the gain calculation unit 172 and the vicinity thereof. In FIG. 6, a risk detection block 180 corresponds to the risk degree calculation unit 166 of FIG. 3. A risk time integration block 182 corresponds to the risk degree update unit 168, and a video signal adjustment block 184 corresponds to the multiplier 174.

Figure 7A:
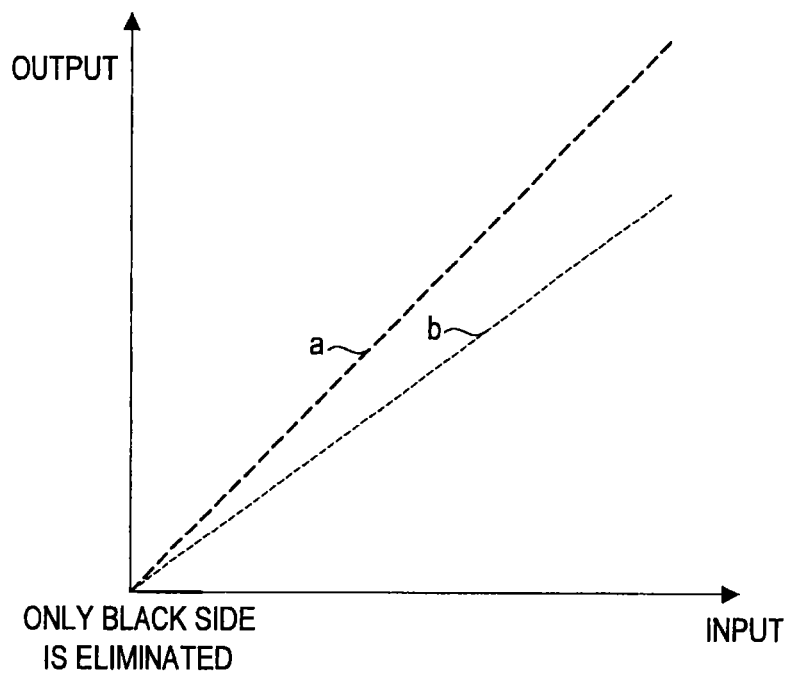
FIGS. 7A and 7B are characteristic diagrams illustrating an example of a relationship between brightness of a video signal input to a signal level correction unit (input brightness) and brightness of a video signal output from a signal level correction unit (output brightness).

FIG. 7 is a characteristic diagram illustrating an example of a relationship between brightness of a video signal input to the signal level correction unit 128 (input brightness) and brightness of a video signal output from the signal level correction unit 128 (output brightness). A dotted line a illustrated in FIG. 7A represents a characteristic before a gain is adjusted according to a risk degree. A dotted line b illustrated in FIG. 7A represents a characteristic in which the characteristic of the dotted line a is multiplied by a gain for reducing brightness of the whole screen (hereinafter, referred to as "first coefficient").

As illustrated in FIG. 6, the gain calculation unit 172 includes an overall image gain calculation block 172a, a high-brightness gamma adjustment block 172b, and a low-gradation gamma adjustment block 172c. The overall image gain calculation block 172a is a block that calculates the above described gain (the first coefficient) for reducing the brightness of the whole screen.

The high-brightness gamma adjustment block 172b is a block for adjusting a gain of a high brightness side. The high-brightness gamma adjustment block 172b reduces the gain using the above described second coefficient at the high brightness side in the characteristics indicated by the dotted line a and the dotted line b of FIG. 7A. As illustrated in FIG. 7A, at a high brightness side, as the high-brightness gamma adjustment block 172b reduces the gain, a characteristic indicated by a dotted line a is converted to a characteristic of a dotted line a1. Similarly, at a high brightness side, as the high-brightness gamma adjustment block 172b reduces the gain, a characteristic of a dotted line b is converted to a characteristic of a dotted line b1.

Figure 7B:
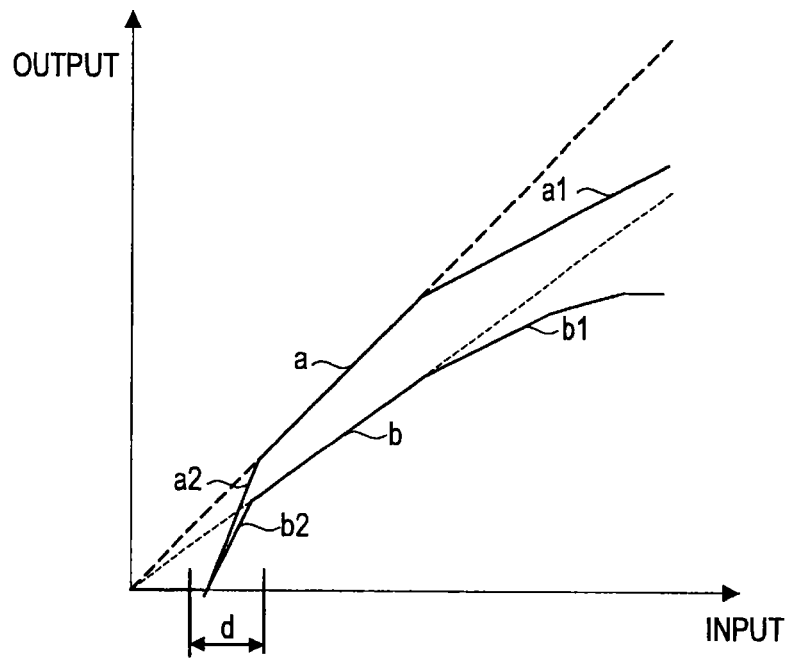

The low-gradation gamma adjustment block 172c is a block that adjusts a gain of a low brightness side. The low-gradation gamma adjustment block 172c reduces the gain using a third coefficient at the low brightness side in the characteristics indicated by the dotted line a and the dotted line b of FIG. 7B. As illustrated in FIG. 7B, at a low brightness side, as the low-gradation gamma adjustment block 172c reduces the gain, a characteristic indicated by the dotted line a is converted to a characteristic of a dotted line a2. Similarly, at a low brightness side, as the low-gradation gamma adjustment block 172c reduces the gain, a characteristic indicated by the dotted line b is converted to a characteristic of a dotted line b2.

As described above, in the present embodiment, a gamma curve is set by three pieces of information obtained by the overall image gain calculation block 172a, the high-brightness gamma adjustment block 172b, and the low-gradation gamma adjustment block 172c. Thus, at the high brightness side, the gain is reduced (the characteristic a1 and the characteristic b1), and at the low brightness side, the gain is also reduced (the characteristic a2 and the characteristic b2). Thus, it is possible to reduce brightness of the whole screen by the first coefficient, reduce a peak of brightness by the second coefficient, and reduce brightness of color combination close to black by the third coefficient.

Here, in the case of reducing a gain only in an area of the high brightness side in which an input is large using the first and second coefficients, a burn-in prevention effect on a pixel or a pixel group that is high in burn-in risk degree is obtained, but as the brightness of the high brightness side is reduced, a contrast deteriorates. For this reason, there is a risk that a video will lose a three-dimensional effect, an object or a human skin in a video will lose a gloss, and an image quality will deteriorate.

In the present embodiment, since the gain is reduced not only at the high brightness side but also at the low brightness side, a pixel displayed by dark color combination (gray or the like) is displayed as black at the low brightness side. Thus, by converting a pixel of dark color combination to a black pixel, it is possible to increase a contrast of a pixel of a low brightness side with respect to a pixel in which a gain is reduced at a high brightness side. Thus, a reduction in contrast caused by a reduction in brightness at a high brightness side can be compensated by a reduction in brightness at a low brightness side, and it is possible to display an excellent image in which a contrast is emphasized and there are a three-dimensional effect and a gloss feeling.

Here, in the case of reducing a gain in an area in which an input is small, it is preferable to reduce a gain in an area in which an existence probability is high in distribution of brightness (a range d illustrated in FIG. 7B). As a result, color combination becomes close to black, a pixel of brightness in which an existence probability is high in a video can be displayed as a black pixel, and a clear image in which a contrast is emphasized can be displayed.

An adjustment of the gain by the overall image gain calculation unit 172a, the high-brightness gamma adjustment block 172*b*, and the low-gradation gamma adjustment block 172*c* are performed in conjunction with one another. For example, in a characteristic of a1-a-a2 illustrated in FIG. 7B, a value of the first coefficient is 1. However, in this case, an amount for reducing the gain at each of the high brightness side and the low brightness side (values of the second coefficient and the third coefficient) is previously decided in association with a value of the first coefficient. Similarly, even in a characteristic of b1-b-b2, the values of the first coefficient, the second coefficient, and the third coefficient are previously decided. As illustrated in FIG. 7B, the second coefficient may have a plurality of values according to brightness. It is also possible to change the values of the first and third coefficients according to brightness.

Further, the values of the first coefficient, the second coefficient, and the third coefficient are adjusted according to the risk degree. When there is a high possibility that the burn-in will occurs, as illustrated in the characteristic of b1-b-b2 in FIG. 7B, by setting the first coefficient to a smaller value and changing the second and third coefficients in conjunction with the first coefficient, brightness at the high brightness side is sufficiently reduced, and so the burn-in can be prevented. In this case, by sufficiently reducing brightness even at the low brightness side according to an amount of reduction in brightness at the high brightness side, a contrast can be emphasized.

Meanwhile, when there is a low possibility that the burn-in will occur, as illustrated in a characteristic of a1-a-a2 in FIG. 7B, the first coefficient is set to a relatively large value, and an amount of reduction in gain at the high brightness side is set to a relatively small value. In this case, at the low brightness side, even if an amount of reduction in gain does not increase as much, a contrast of an image can be maintained.

Thus, when there is a high possibility that the burn-in will occur, by reducing a gain at a high brightness side, the occurrence of the burn-in can be reliably prevented. Further, by reducing a gain at a low brightness side in conjunction with a reduction in a gain at a high brightness side, a contrast of an image can be prevented from being lost, and an image having a three-dimensional effect in which a contrast is emphasized can be provided.

6. Method of Driving Display Device

Figure 8:
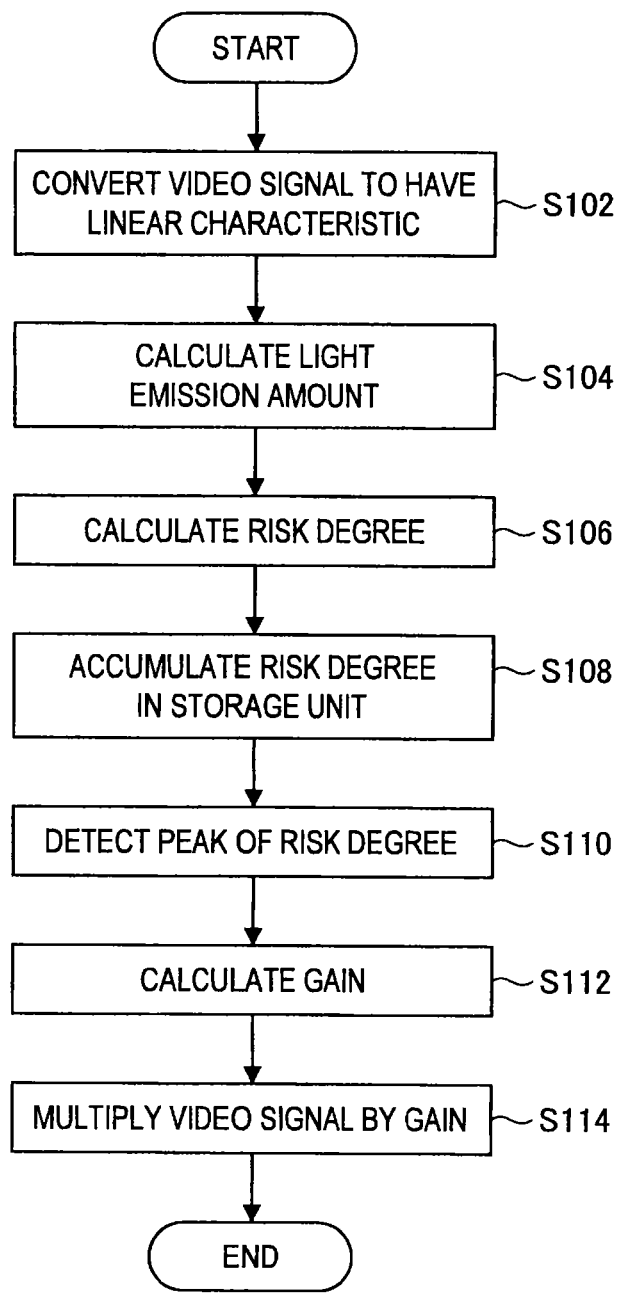
FIG. 8 is a flowchart illustrating a method of driving a display device according to an embodiment of the present invention.

Next, a method of driving the display device 100 according to an embodiment of the present invention will be described. FIG. 8 is a flowchart illustrating a method of driving the display device 100 according to an embodiment of the present invention. Hereinafter, a method of driving the display device 100 will be described with reference to FIG. 8.

First, the linear conversion unit 116 performs a conversion process on a video signal having a gamma characteristic to have a linear characteristic (step S102). In the present embodiment, the video signal of 10 bits is expanded to 14 bits by the conversion process by the linear conversion unit 116.

The video signal converted to have the linear characteristic is input to the light emission amount calculation unit 164. The light emission amount calculation unit 164 calculates the light emission amount from the input video signal (step S104). Since the video signal input to the light emission amount calculation unit 164 has the linear characteristic, the light emission amount in the panel 158 can be obtained from the intensity of a signal.

The light emission amount is acquired in units of pixels or in units of pixel groups in which a predetermined number of pixels are collected. The acquired light emission amount is transmitted to the risk degree calculation unit 166 in association with the pixel or the pixel group. The risk degree calculation unit 166 detects whether or not the light emission amount has exceeded a predetermined value in units of pixels or in units of pixel groups, and if the light emission amount has exceeded the predetermined value, the exceeding value is calculated as the risk degree (step S106).

If the risk degree is calculated by the risk degree calculation unit 166, the calculated risk degree is transmitted to the risk degree update unit 168. The risk degree update unit 168 accumulates the risk degree of each pixel or each pixel group in the storage unit 150 as the risk degree map as described above (step S108). The storage unit 150 sequentially accumulates the risk degree of each pixel or each pixel group while the display device 100 is powered on. The accumulated risk degree is transmitted to the risk degree update unit 168 and used for an adjustment of brightness of an image displayed on the panel 158.

If the risk degree is accumulated in the storage unit 150, an adjustment of brightness of an image displayed on the panel 158 is performed based on information of the risk degree map created by accumulation of the risk degree. The created risk degree map is transmitted from the risk degree update unit 168 to the peak detection unit 170, and the peak detection unit 170 detects a pixel or a pixel group having a peak risk degree from the risk degree map (step S110).

If a pixel or a pixel group having a peak risk degree is detected from the risk degree map, the peak detection unit 170 inputs the video signal, the risk degree, and the pixel or the pixel group having a peak risk degree to the gain calculation unit 172, and the gain is calculated using the input information (step S112). Here, the gain (the first coefficient) on the pixel or the pixel group having a peak risk degree for reducing brightness to a degree in which the burn-in phenomenon does not occur, the gain (the first coefficient) for reducing brightness of the whole screen, and the gain (the third coefficient) for reducing brightness at the low brightness side in order to emphasize a contrast are calculated.

If the gain is calculated by the gain calculation unit 172, the calculated gain is input to the multiplier 174, and the video signal is multiplied by the gain (step S114). Here, the video signal is multiplied by the gain on the pixel or the pixel group in which the risk degree is peak, the gain for reducing brightness of the whole screen, and the gain for reducing brightness of the low brightness side.

As described above, by detecting the pixel or the pixel group in which the risk degree is peak from the risk degree map and calculating the gain for reducing brightness on the corresponding pixel or pixel group, the burn-in phenomenon on the pixel that continuously emits bright light can be prevented. Further, by calculating the gain for reducing brightness of the whole screen and reducing brightness of the whole screen as well as the pixel or the pixel group in which the risk degree is peak, compared to the case of reducing brightness of only the pixel or the pixel group in which the risk degree is peak, a more natural image can be obtained.

A series of processes of the method of driving the display device 100 has been described with reference to FIG. 8, but as described above, in the method of driving the display device 100 according to an embodiment of the present invention, while power of the display device 100 is supplied, a calculation and accumulation of the risk degree are repeated at a predetermined interval.

The method of driving the display device 100 according to an embodiment of the present invention has been described above in detail. The above described method of driving the display device 100 may be performed such that a computer program created to execute the method of driving the display device 100 is previously recorded in a recording medium (for example, the recording unit 106) inside the display device 100, and the corresponding program is sequentially read and executed by an arithmetic device (for example, the control unit 104).

As described above, by calculating a light emission amount of each pixel from the video signal and the panel, calculating a gain for reducing the light emission amount on a pixel or a pixel group that emits light while exceeding a predetermined light emission amount, and multiplying the video signal by the calculated gain, the burn-in phenomenon of an image can be prevented. Further, deterioration of the light emitting device can be retarded.

In a situation in which the burn-in is likely to occur, since the gain is reduced not only at the high brightness side but also at the low brightness side, the burn-in can be prevented, and the high contrast of the image can be maintained. Thus, a reduction in contrast caused by a countermeasure of burn-in prevention can be reliably prevented. Further, as a risk value is accumulated, the gain calculation unit 172 gradually reduces the gain. Thus, the user who is watching a video through the display device 100 does not feel a change in brightness of the video displayed on a screen.

In the light-emitting device of the light emitting type such as the organic EL device, the current and the light emission amounts have a linear characteristic. Thus, the light emission amount of the light emitting device can be obtained by acquiring the current amount. Thus, unlike the convention display device that suppresses the burn-in, by detecting the light emission amount without performing feedback, the burn-in can be prevented by previously acquiring the light emission amount.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, in the above embodiment, the risk degree is calculated on all pixels to create the risk degree map, and the gain for reducing brightness on the pixel or the pixel group having a peak value of the risk degree is calculated. However, the present invention is not limited thereto. For example, the risk degree may be calculated only on a predetermined range on a screen to create the risk degree map, or the risk degree map may be created independently on a plurality of areas on a screen.

INDUSTRIAL APPLICABILITY

For example, the present invention can broadly be applied to a display device used for a television receiver or the like.

REFERENCE SIGNS LIST 100 display device
104 control unit
150 storage unit
158 panel
164 light emission amount calculation unit
168 risk degree update unit
172 gain calculation unit
172a overall screen gain calculation block
172b high-brightness gamma adjustment block
172c low-gradation gamma adjustment block

The invention claimed is:

1. A display device, comprising:
a display in which a plurality of pixels that emit light in response to a video signal are arranged; and
circuitry configured to
acquire a light emission amount corresponding to a plurality of positions of the plurality of pixels of the display based on a video signal supplied to the display,
accumulate data related to the light emission amount accumulated based on a video signal of a plurality of frames, the data related to the light emission amount including calculated degrees of burn-in risk corresponding to the plurality of positions, and
reduce brightness of the display, associated with the video signal supplied to the display, based on the accumulated data related to the light emission amount.

2. The display device of claim 1, wherein the circuitry is configured to
reduce brightness of a high brightness side of the display, associated with the video signal, based on the accumulated data related to the light emission amount, and
reduce brightness of a low brightness side of the display, associated with the video signal, in conjunction with a reduction in brightness of the high brightness side.

3. The display device of claim 2, wherein the circuitry is configured to
reduce the brightness of the high brightness side by a first coefficient, and
reduce the brightness of the low brightness side by a second coefficient, the second coefficient being different from the first coefficient.

4. The display device of claim 2, wherein the circuitry is configured to
further reduce brightness of the high brightness side as the accumulated light emission amount is larger, based on the accumulated data related to the light emission amount.

5. The display device of claim 2, wherein the circuitry is configured to
further reduce an overall brightness of the display, associated with the video signal, in conjunction with a reduction in brightness of the high brightness side and the low brightness side.

6. A method of driving a display device, comprising:
acquiring a light emission amount corresponding to a plurality of positions of a plurality of pixels that emit light, the plurality of pixels arranged in a display, based on a video signal supplied to the display;
accumulating data related to the light emission amount accumulated based on a video signal of a plurality of frames, the data related to the light emission amount including calculated degrees of burn-in risk corresponding to the plurality of positions; and
reducing brightness of the display, associated with the video signal supplied to the display, based on the accumulated data related to the light emission amount.

7. The method of claim 6, further comprising:
reducing brightness of a high brightness side of the display, associated with the video signal, based on the accumulated data related to the light emission amount; and
reducing brightness of a low brightness side of the display, associated with the video signal, in conjunction with a reduction in brightness of the high brightness side.

8. The method of claim 7, wherein
the reducing reduces the brightness of the high brightness side by a first coefficient, and
the reducing reduces the brightness of the low brightness side by a second coefficient, the second coefficient being different from the first coefficient.

9. The method of claim 7, wherein
the reducing further reduces the brightness of the high brightness side as the accumulated light emission amount is larger, based on the accumulated data related to the light emission amount.

10. The method of claim 7, further comprising:
reducing an overall brightness of the display, associated with the video signal, in conjunction with a reduction in brightness of the high brightness side and the low brightness side.

11. A non-transitory computer readable storage medium encoded with computer program instructions which when executed by a computer cause the computer to execute a method of driving a display device, the method comprising:
acquiring a light emission amount corresponding to a plurality of positions of a plurality of pixels that emit light, the plurality of pixels arranged in a display, based on a video signal supplied to the display;
accumulating data related to the light emission amount accumulated based on a video signal of a plurality of frames, the data related to the light emission amount including calculated degrees of burn-in risk corresponding to the plurality of positions; and
reducing brightness of the display, associated with the video signal supplied to the display, based on the accumulated data related to the light emission amount.

12. The non-transitory computer readable storage medium of claim 11, the method further comprising:
reducing brightness of a high brightness side of the display, associated with the video signal, based on the accumulated data related to the light emission amount; and
reducing brightness of a low brightness side of the display, associated with the video signal, in conjunction with a reduction in brightness of the high brightness side.

13. The non-transitory computer readable storage medium of claim 12, wherein
the reducing reduces the brightness of the high brightness side by a first coefficient, and
the reducing reduces the brightness of the low brightness side by a second coefficient, the second coefficient being different from the first coefficient.

14. The non-transitory computer readable storage medium of claim 12, wherein
the reducing further reduces the brightness of the high brightness side as the accumulated light emission amount is larger, based on the accumulated data related to the light emission amount.

15. The non-transitory computer readable storage medium of claim 12, the method further comprising:
reducing an overall brightness of the display, associated with the video signal, in conjunction with a reduction in brightness of the high brightness side and the low brightness side.

* * * * *